US006730187B1

(12) United States Patent
Luedke

(10) Patent No.: US 6,730,187 B1
(45) Date of Patent: May 4, 2004

(54) METHOD OF MAKING AN IN SITU FORMED EMBEDDED RELIEF FOR A TRUCK BED

(76) Inventor: Craig A. Luedke, 3959 Hackberry Ct., Imperial, MO (US) 63052

(*) Notice: Subject to any disclaimer, the term of this patent is extended or adjusted under 35 U.S.C. 154(b) by 0 days.

(21) Appl. No.: 10/114,853

(22) Filed: Apr. 2, 2002

(51) Int. Cl.⁷ .............................................. B60R 13/01
(52) U.S. Cl. .................. 156/242; 156/280; 156/293; 296/392; 40/591; 40/616
(58) Field of Search .................... 296/39.2; 40/584, 40/591, 616; 156/242, 245, 278, 280, 293; 52/38

(56) References Cited

U.S. PATENT DOCUMENTS

| | | | |
|---|---|---|---|
| 3,958,350 A | * 5/1976 | Garson | 40/591 |
| 4,363,617 A | 12/1982 | Hirsekorn | 425/388 |
| 5,308,133 A | 5/1994 | Mangum et al. | 296/39.2 |
| 5,814,398 A | 9/1998 | Kronz et al. | 428/338 |
| 5,887,931 A | * 3/1999 | Bills et al. | 296/39.1 |
| 5,925,466 A | 7/1999 | Burton | 428/423.1 |
| 6,063,444 A | * 5/2000 | Dax | 427/272 |
| 6,076,879 A | 6/2000 | Bills et al. | 296/39.1 |
| 6,126,999 A | * 10/2000 | Tomasino et al. | 427/388.4 |

* cited by examiner

Primary Examiner—Jeff H. Aftergut
Assistant Examiner—Barbara J Musser
(74) Attorney, Agent, or Firm—Grace J. Fishel

(57) ABSTRACT

An in situ formed bed liner has an embedded relief indicia. The relief may be formed separately and may have associated structure to mate with the surface of a pickup bed to which it is applied. The formed relief indicia is attached to the desired surface and encapsulated in the bed liner by subsequently coating the bed liner into the pickup bed and over the attached relief indicia. The embedded relief may be treated to give it a contrasting color to the in situ formed bed liner.

8 Claims, 6 Drawing Sheets

US 6,730,187 B1

METHOD OF MAKING AN IN SITU FORMED EMBEDDED RELIEF FOR A TRUCK BED

BACKGROUND OF THE INVENTION

1. Field of the Invention

This invention relates to the art of forming protective layers or liners in or on surfaces. In particular, this invention relates to the art of forming in situ protective liners in truck beds and the like.

2. Brief Description of the Prior Art

It is known to provide wear resistant liners for vehicle surfaces. For example, truck beds are commonly provided with protective inserts which guard the beds against damage from impact and frictional wear. A conventional bed liner for pickups and light trucks is a well known example of these structures. These bed liners include preformed plastic liners which are manufactured to fit specific vehicles and in situ formed liners. The in situ formed liners are applied as mastics, i.e., by spray coating, which harden to form a tightly bonded protective coating on the surface to which they are applied.

The following U.S. patents are incorporated by reference herein: U.S. Pat. Nos. 4,363,617, 5,308,133, 5,814,398, 5,925,466 and 6,076,879.

BRIEF SUMMARY OF THE INVENTION

The present invention permits an indicia in the form of, a relief to be easily applied to a vehicle or other surface and incorporated as a part of an in situ formed bed liner, for example. Typically, the preferred location for the indicia has an irregular surface and presents difficulties in creating and/or attaching a durable and aesthetically pleasing relief. Applying an indicia after a bed liner has been formed presents additional problems. It is difficult to get a secure attachment of a separate indicia to the outer surface of an in situ formed bed liner. The present invention solves these and other problems, as disclosed herein, by providing mating shapes for the relief which permit the relief to conform to the surface to which it is applied.

The reliefs of the invention may be formed by conventional fabrication processes and can be joined to the desired surface by conventional fastening structures, including fasteners, adhesives and tapes. The mating shapes provided for the relief allow the relief to be easily and quickly positioned and installed on its associated surface. When the relief is installed, the bed liner can be formed, for example by coating. The coating encapsulates the relief forming a durable and attractive indicia in the bed liner.

It is thus an object of the invention to provide a relief in an in situ formed bed liner. It is a further object of the invention to produce a relief which has associated structure to mate with the surfaces of a vehicle bed. It is another object to encapsulate a relief in the coating of an in situ formed bed liner to form an embedded relief in the substrate of the bed liner. It is also an object of the invention to form a relief which can be incorporated in an in situ formed bed liner. Other objects and features of the invention will be in part apparent and in part pointed out hereinafter.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 10:
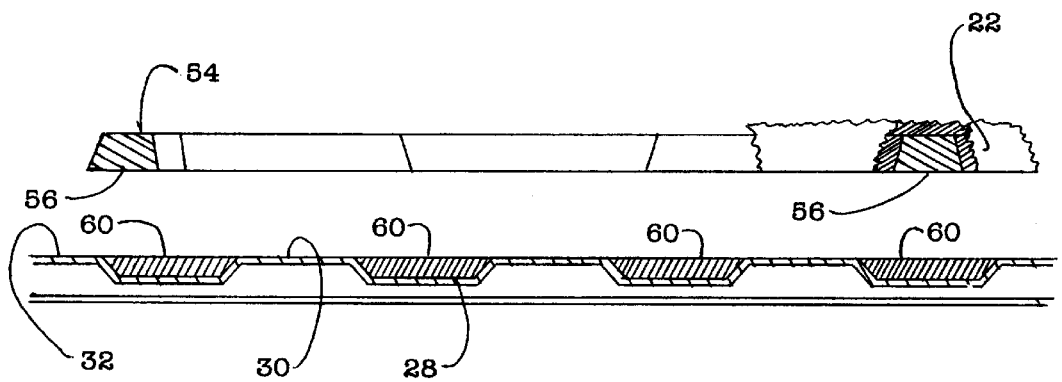
FIG. 10 is a partial exploded cross-sectional view of the pickup bed, the attachment structure and the relief shown in FIG. 9 taken along the plane 10—10 shown in FIG. 9.

Referring to FIGS. 1–2, 7 and 9, a conventional vehicle bed is shown by way of illustration, as pickup bed 20. Pickup bed 20 has an in situ formed bed liner 22 and an embedded relief 24 according to the invention. The in situ formed bed liner 22 is shown as partially broken in FIGS. 1 and 9–10, but it will be appreciated that the complete in situ formed bed liner 22 may cover all of the interior of the pickup bed 20 or selected portions of the interior of the pickup bed 20 and could be extended beyond the pickup bed 20, if desired.

Pickup bed 20 is provided with a series of ribs or correlations 26 to strengthen the pickup bed 20, as is known in the art. Ribs or correlations 26 provide the pickup bed 20 with raised portions 28 and lowered portions 30. As shown, relief 24 is attached to an interior wall 32 of pickup bed 20. In the drawings, relief 24 is illustrated as a commercial indicia, which may be the trademark of the vehicle's manufacturer, shown here as the trademark of the Chevrolet Division of the General Motors Corporation. However, any indicia may be applied to pickup bed 20 in the manner described herein. Relief 24 may have any of a variety of decorative motifs, such as animal figures, outdoor scenes and the like or names and/or initials significant to the owner of the truck.

Figure 1:
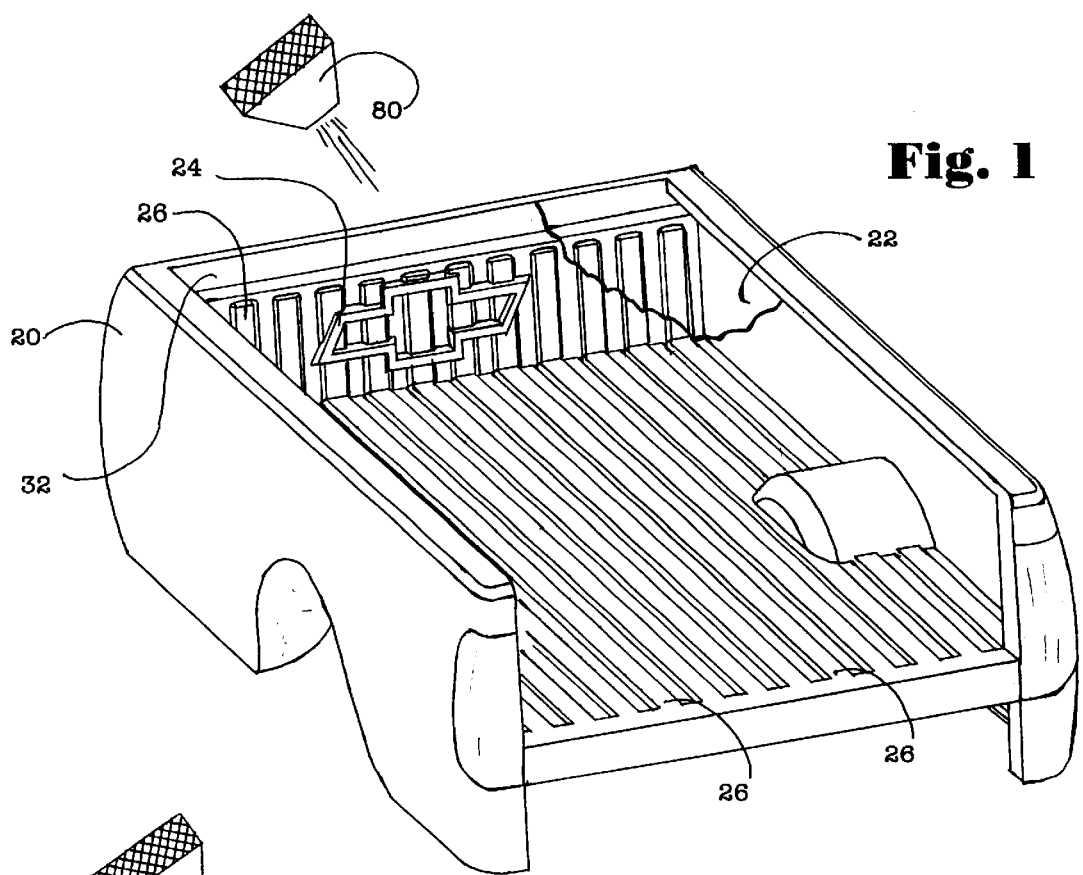
FIG. 1 is a perspective view of a pickup bed having an in situ formed bed liner and a relief according to this invention.
Figure 2:
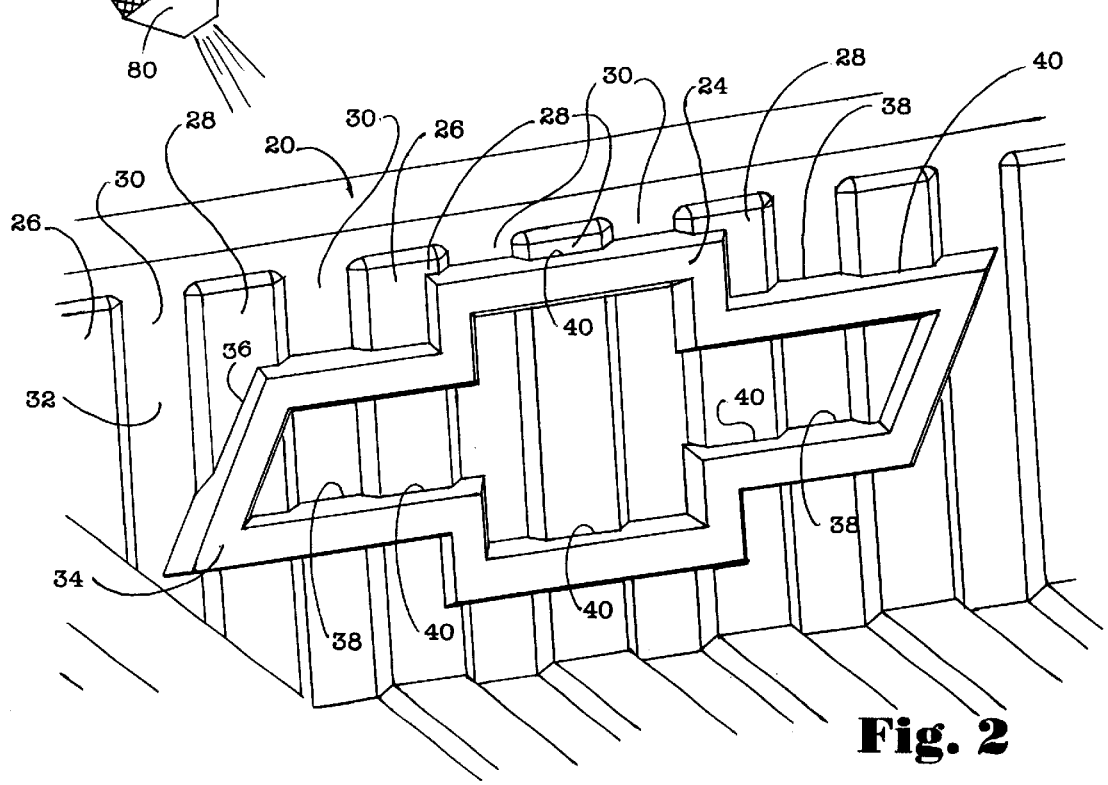
FIG. 2 is an enlarged partial view of the pickup bed shown in FIG. 1 and showing the attachment of the relief in greater detail.
Figure 3:
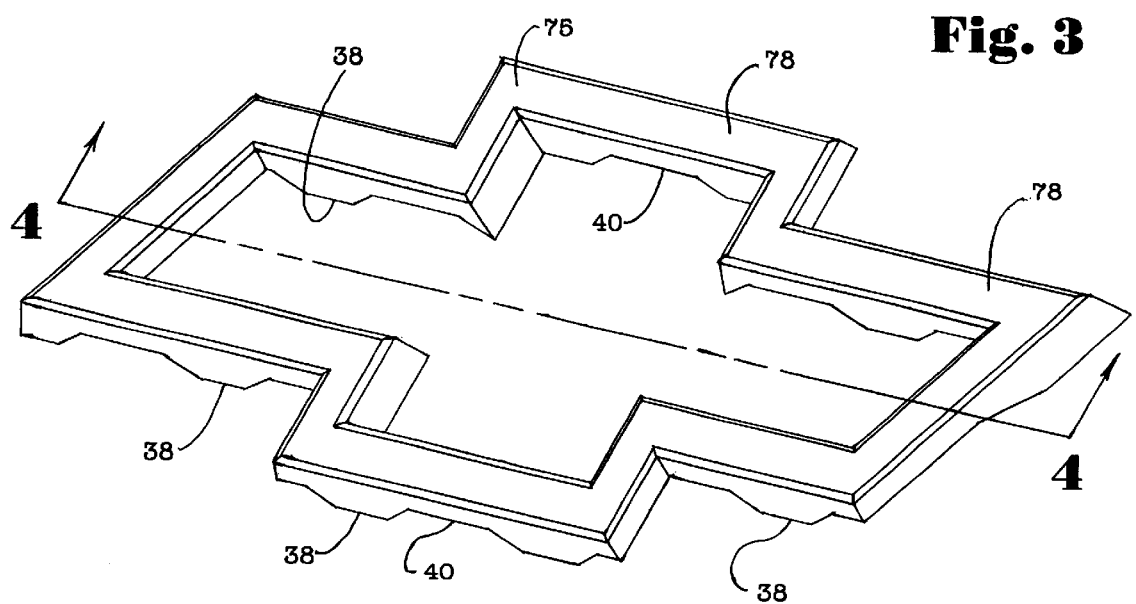
FIG. 3 is a further enlarged, perspective view of the relief shown in FIGS. 1 and 2 showing the relief in greater detail.
Figure 4:
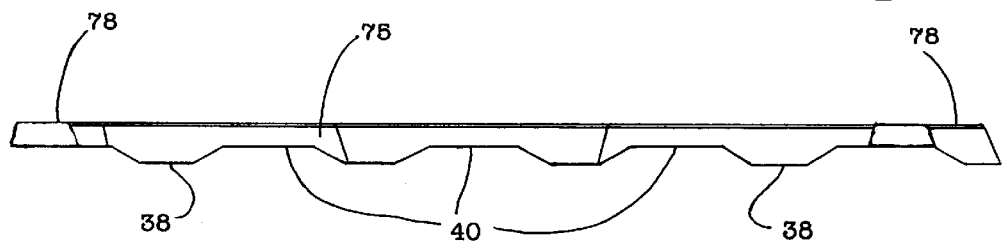
FIG. 4 is a cross-sectional view of the relief shown in FIG. 3 taken along the plane 4—4 shown in FIG. 3.

As shown in FIGS. 1 and 2, the relief 24 has an outer surface 34 and an inner surface 36. The outer surface 34 of relief 24 may have any desired contour and is shown in FIGS. 2–4 as substantially planar. Inner surface 36 of relief 24 is formed to mate with ribs or correlations 26 in the pickup bed 20, as shown in FIG. 2. Inner surface 36 of relief 24 has raised portions 38 which are sized and spaced to mate with and fill at least a portion of lowered portions 30 of pickup bed 20. Inner surface 36 also has lowered portions 40 which are sized and spaced to mate raised portions 28 of pickup bed 20, as shown.

Figure 5:
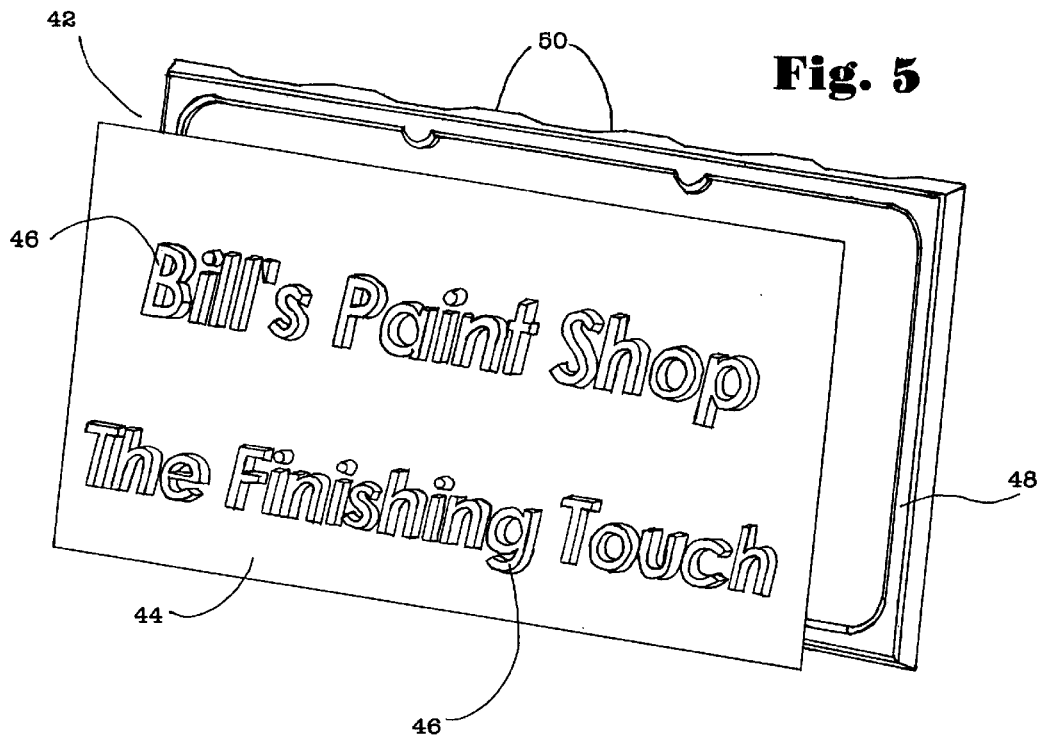
FIG. 5 is an exploded perspective view of an alternative relief and attachment structure.
Figure 6:
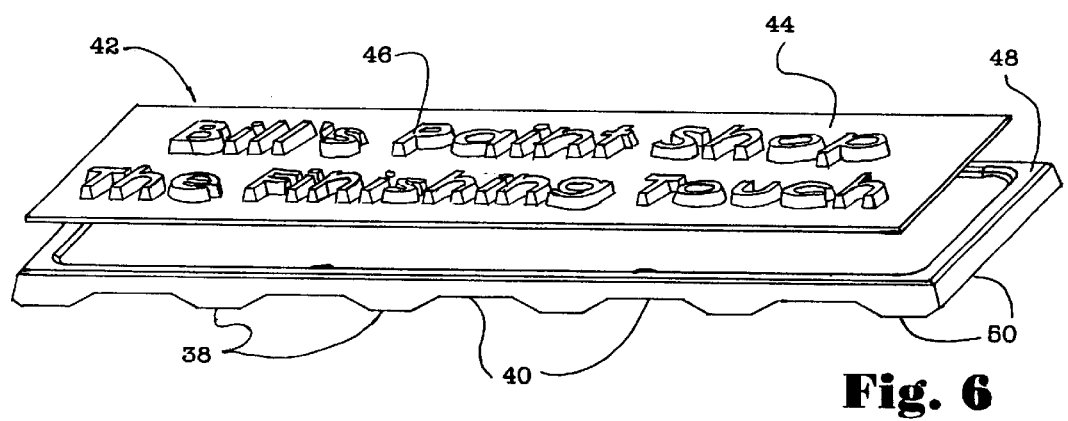
FIG. 6 is an additional exploded perspective view of the relief and attachment structure of FIG. 5.
Figure 7:
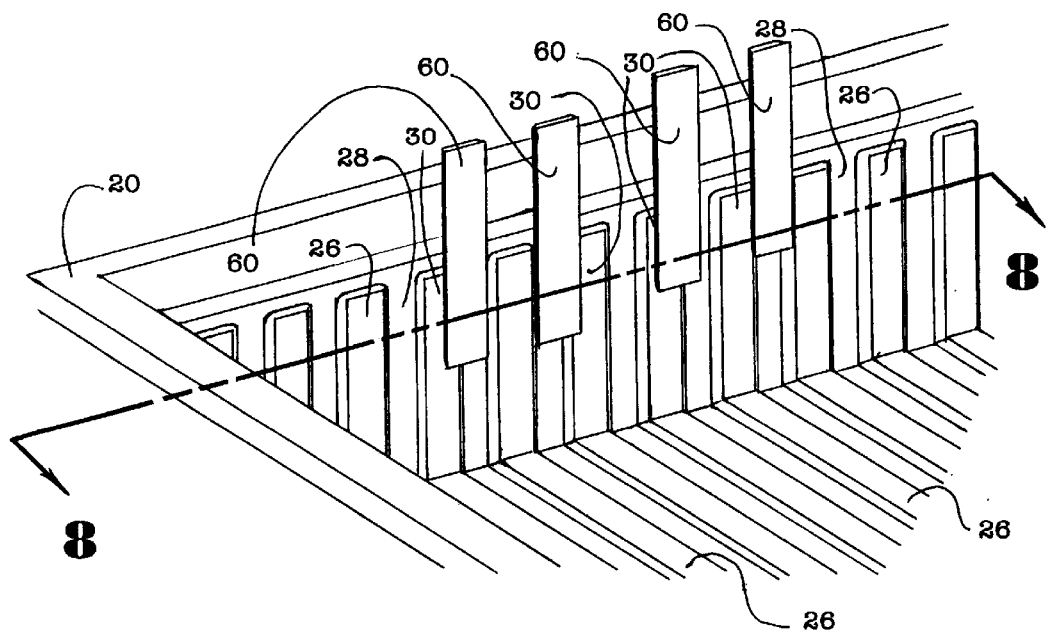
FIG. 7 is a partial perspective exploded view of a pickup bed having an in situ formed bed liner and an alternative attachment structure for a relief.
Figure 8:
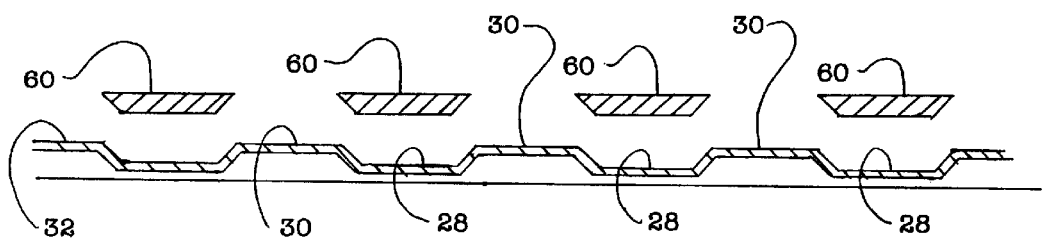
FIG. 8 is a partial exploded cross-sectional view of the pickup bed and attachment structure shown in FIG. 7 taken along the plane 8—8 shown in FIG. 7.
Figure 9:
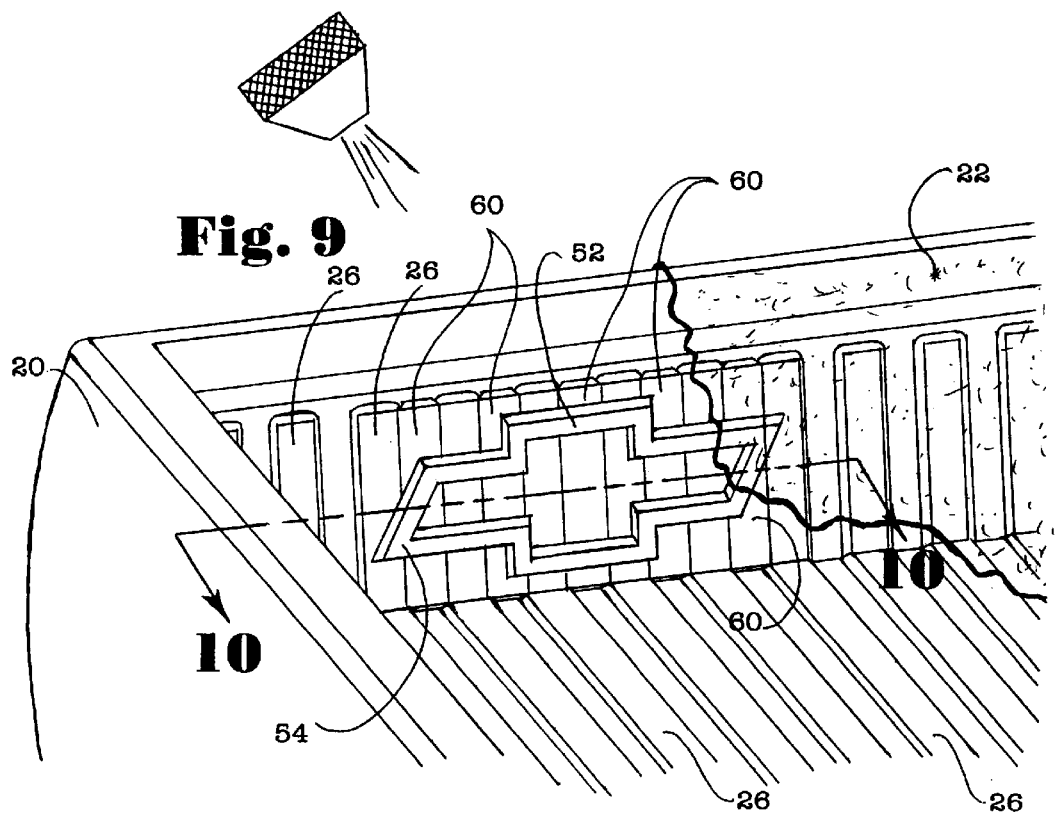
FIG. 9 is a partial perspective view of a pickup bed having an in situ formed bed liner and a relief attached by the attaching structure shown in FIG. 7.

Relief 24 may be unitary or it may be formed of a plurality of parts. FIGS. 5 and 6 show an alternative relief 42 which is formed of a plurality of parts which are assembled to form complete relief 42. As shown, alternative relief 42 has a platform 44 on which a plurality of raised letters 46 are placed to present a commercial message. Platform 44 is joined to a base 48 which is provided with an inner surface 50. Inner surface 50 of base 48 has raised portions 38 and lowered portions 40 which mate with ribs or correlations 26 of pickup bed 20, as previously described.

A further alternative structure is shown in FIGS. 7–10. As shown, a relief 52 has an outer surface 54, which may be of any desired contour, but is shown as being substantially planar. An inner surface 56 of relief 52 is substantially planar. A plurality of fillers 60 are sized and shaped to mate into lowered portions 30 of ribs or correlations 26 of pickup bed 20. When in place, fillers 60 form a substantially continuous planar surface with raised portions 28 of ribs or correlations 26. This substantially continuous planar surface can then be mated with inner surface 56 of relief 52. While inner surface 56 and its mating surface have been described as being planar or substantially planar it will be appreciated that other mating contours may be used with appropriated fillers 60.

Reliefs 24, 42 and 52, and fillers 60, may be formed of any conventional material, such as wood, metal and plastic, either foamed or solid, and the shape may be formed by any conventional method of fabrication, such as machining, stamping, welding, casting, laminating and molding. The components of reliefs 24, 42 and 52 may also be assembled by such methods and by the use of conventional fasteners, such as rivets and screws, and by the use of conventional adhesives. Reliefs 24, 42 and 52, and the fillers 60, may be attached to the interior wall 32 of the pickup bed 20 by similar conventional methods and structures.

Figure 11:
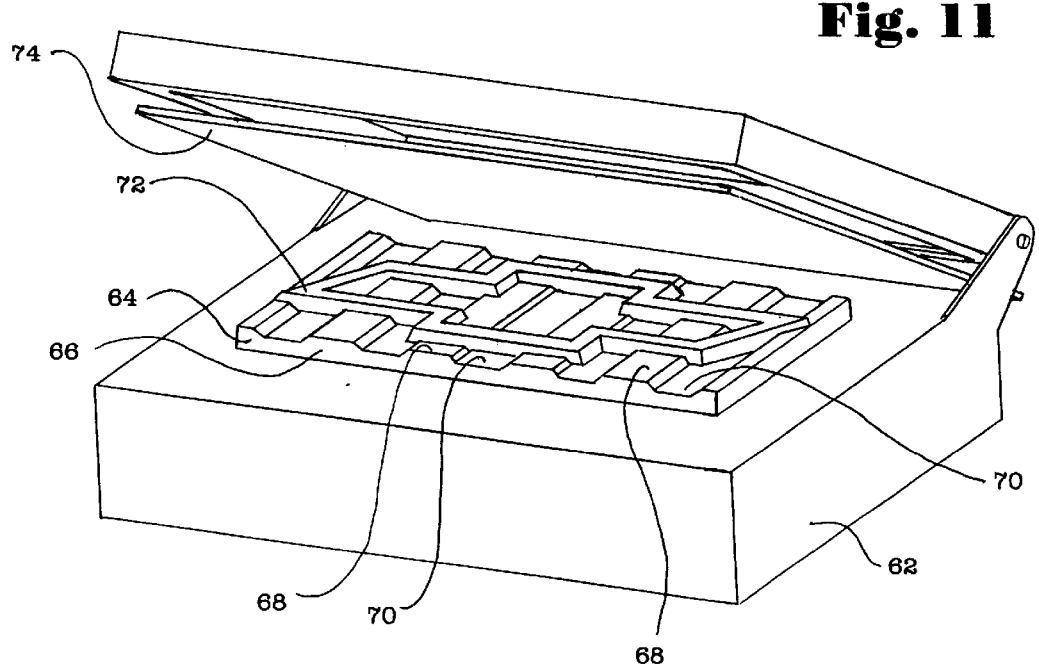
FIG. 11 is a schematic, in perspective, of a vacuum forming die suitable for forming a relief according to the invention.
Figure 12:
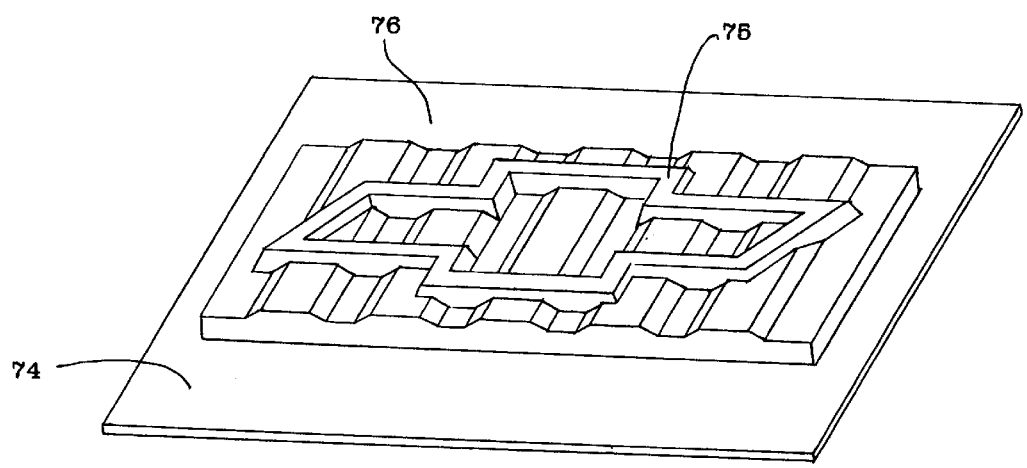
FIG. 12 is a perspective view of an untrimmed relief according to the invention as removed from the vacuum forming die shown in FIG. 11.

FIGS. 11–12 show, in schematic, one method of forming a relief according to the invention. A conventional vacuum forming machine 62 is equipped with a male die 64 which has the pattern 66 of ribs and correlations 26 of pickup bed 20. Raised portions 68 of the pattern 66 match raised portions 28 of pickup bed 20 and lowered portions 70 of pattern 66 match lowered portions 30 of pickup bed 20. Male die 64 also has a pattern 72 like that illustrated in reliefs 24, 42 and 52. A sheet of a conventional vacuum forming plastic 74, such as a polyethylene or a polypropylene, is placed in vacuum forming machine 62 and subjected to heat, from a heat source not shown, and to vacuum, for example through channels underneath die 64, also not shown.

The vacuum forming process, as is conventional, forms a positive image of relief 75 of pattern 72 in surface 76 of plastic sheet 74, as shown in FIG. 12. The relief 72 is trimmed to remove the remainder of the plastic sheet 74. The trimmed relief 75, shown in FIGS. 3–4, has an outer surface 78 and raised portions 38 and lowered portions 50 which mate with ribs or correlations 26 of pickup bed 20, as previously described. It will be understood that solid reliefs may be cast in a mold as opposed to being hollow when made by the vacuum forming process as just described.

INSTALLATION AND FORMATION OF THE IN SITU RELIEF

To complete the formation of an in situ formed bed liner having an embedded indicia in relief, the relief such as any of reliefs 24, 42, 52 or 75, is first formed in the manner described herein. The chosen relief, e.g., relief 24 (FIG. 1) or 52 (FIG. 7), is then attached to interior wall 32 of the pickup bed 20 in the manner described herein. The interior surfaces of the pickup bed are then prepared for coating, as is known in the art. A suitably durable precursor for bed liner 22 is then coated onto the surfaces in the interior of the pickup bed 20 and over the relief 24. Coating of the bed liner 22 may be performed using a conventional spraying gun or spray head 80, shown in schematic in FIGS. 1 and 7, as known in the art. Other methods of application of the coating may also be used as desired, such as brushing, troweling and roller coating.

The coating, or the coating precursor, for bed liner 22 may be any of a variety of mastic or other protective materials. The coating may be of the single component or the multiple component types, as is known in the art. Such materials include rigid and semi-rigid polymers and elastomers, for example urethanes, ureas, epoxies, amides, vinyls, neoprenes and hybrid polymers may be used. By way of illustration, but not limitation, the materials and methods disclosed in U.S. Pat. Nos. 5,814,398 and 5,925,466 are suitable for forming a bed liner having the embedded relief of the invention.

Bed liner 22 will typically be formed in a layer of about one eighth to one quarter of an inch in thickness, but it will be appreciated that thinner or thicker layers may be used as desired and as permitted by the coating system employed. The formed bed liner 22 encapsulates the relief, e.g., relief 24 (FIG. 1) or relief 52 (FIG. 7), under the layer of bed liner 22 and against interior wall 32 of pickup bed 20. Embedded reliefs 24, 42, 52 or other embedded reliefs in accordance with the present invention may be painted to give them a contrasting color from bed liner 22 or it may be of a contrasting color and masked to reveal a contrast when the mask is removed after coating, as is known in the art.

It will be appreciated by those skilled in the art that the description given herein is for illustrative purposes and that various changes and modifications may be made to the embodiments disclosed herein without departing from the spirit of the invention. For example, the relief disclosed herein can incorporate additional materials and additional coatings. While the invention has been described with reference to the bed of a conventional pickup truck, it will be appreciated that other vehicles and indeed other surfaces may employ the invention disclosed herein.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A method of forming an embedded relief with an in situ formed liner of a vehicle bed, the vehicle bed having a surface with reinforcing ribs or correlation, the ribs or correlation having lowered portions and raised portions, comprising preparing an indicia having a front and a back, the front of the indicia having a shape substantially corresponding to the shape of the desired relief, molding the back of the indicia to form a positive image that is substantially flush with a portion of the surface having ribs or correlation, mating the molded back of the indicia and the surface, joining the back of the indicia to the surface to attach the indicia to the surface, the front of the indicia extending outwardly from the surface, and forming a liner on the surface by applying a layer of a precursor material on the surface, the precursor material covering the surface and covering the front of the attached indicia, reacting the applied precursor material to form a solid liner in the vehicle bed, the liner bonding to and encapsulating the attached indicia on the surface, the liner substantially conforming to the shape of the front of the attached indicia and producing an embedded relief extending outwardly from the surface.

2. The method of claim 1 wherein the indicia is attached to the surface by an adhesive.

3. The method of claim 1 wherein the indicia is unitary.

4. The method of claim 1 including forming the indicia of a plurality of elements.

5. The method of claim 1 including applying color to the relief contrasting to the color of the in situ formed liner after the relief is encapsulated.

6. The method of claim 1 including forming ribs or crenelations on at least a portion of the back of the indicia and rating the crenelations on the back of the indicia with the ribs or crenelations of the vehicle bed.

7. The method of claim 1 including placing fillers in at least some of the lowered portions of the ribs or crenelations of the vehicle bed.

8. The method of claim 1 including placing fillers in at least some of the lowered portions of the ribs or crenelations of the vehicle bed to form a first substantially planar area on at least a part of the surface, forming a second substantially planar area on the back of the indicia to conform to the first substantially planar area on the surface and mating the first and second substantially planar areas.

* * * * *